Patented Sept. 24, 1935

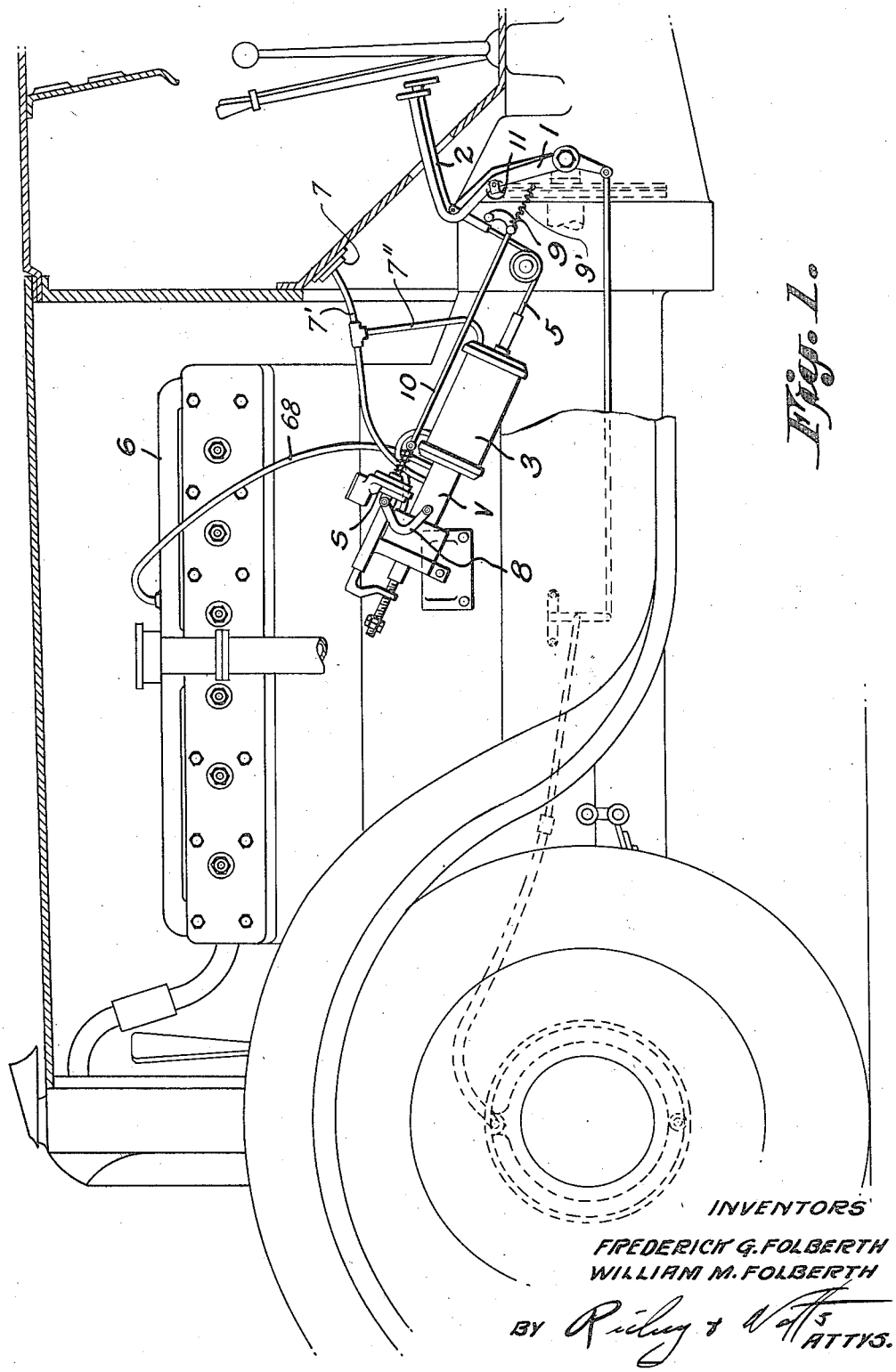

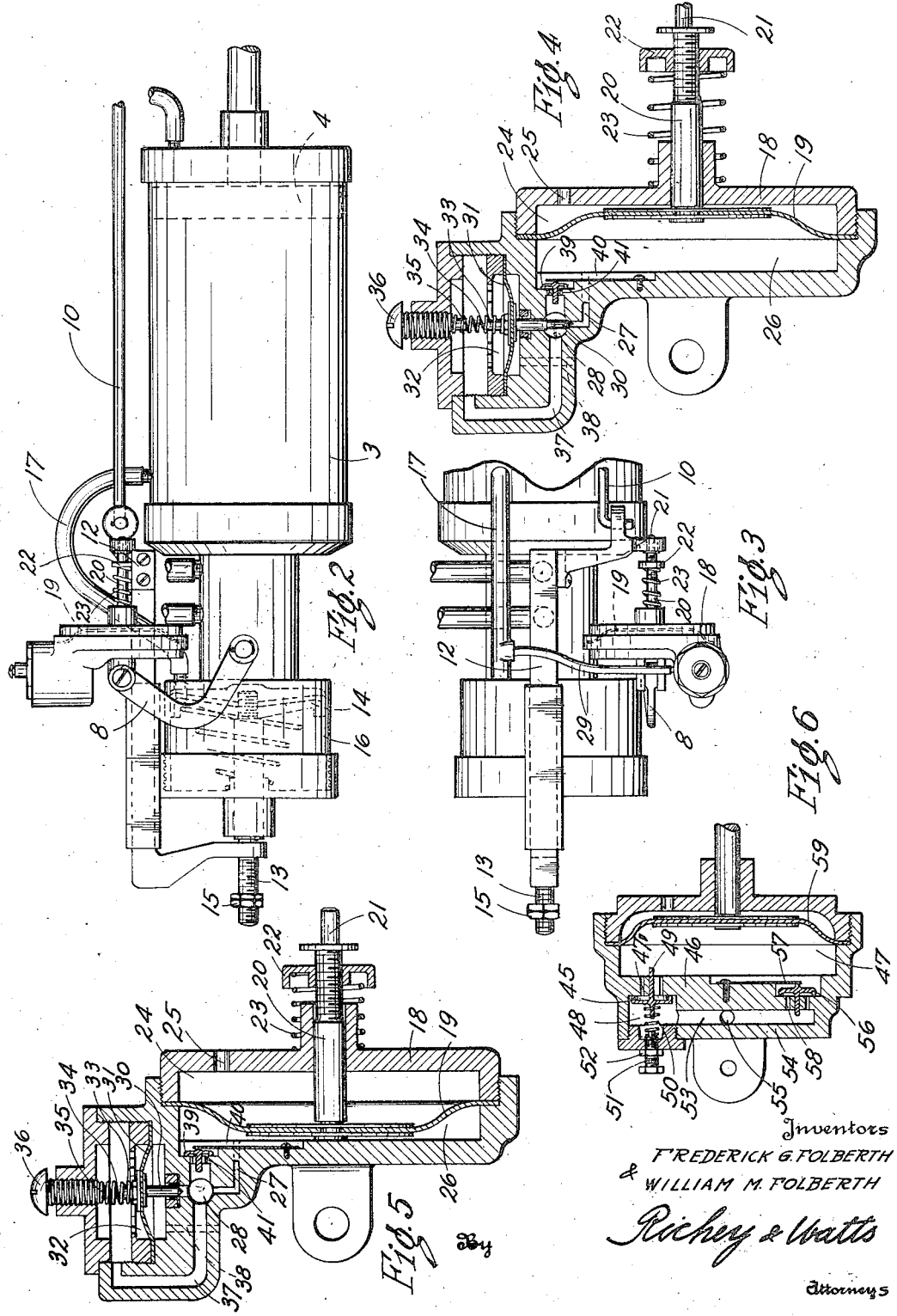

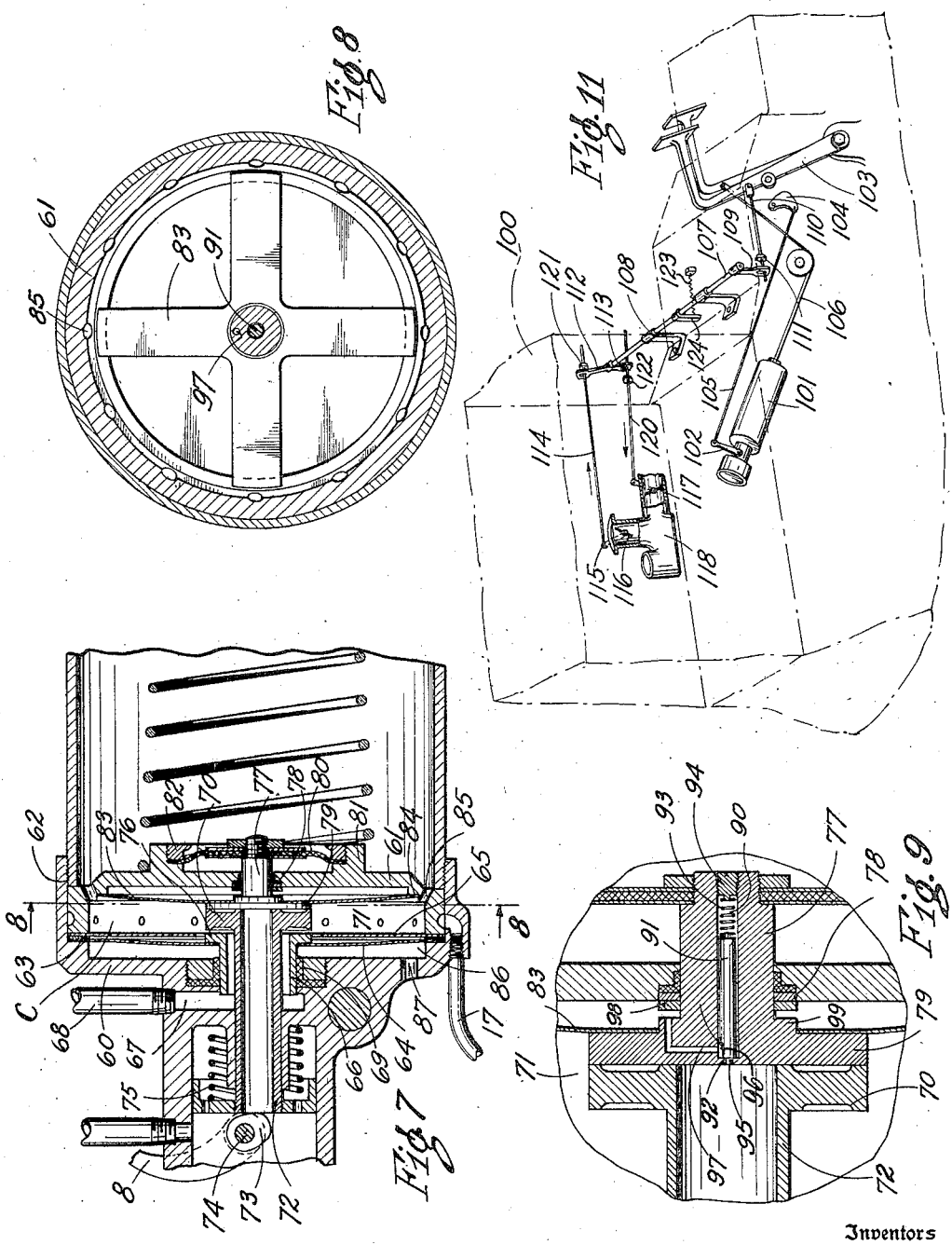

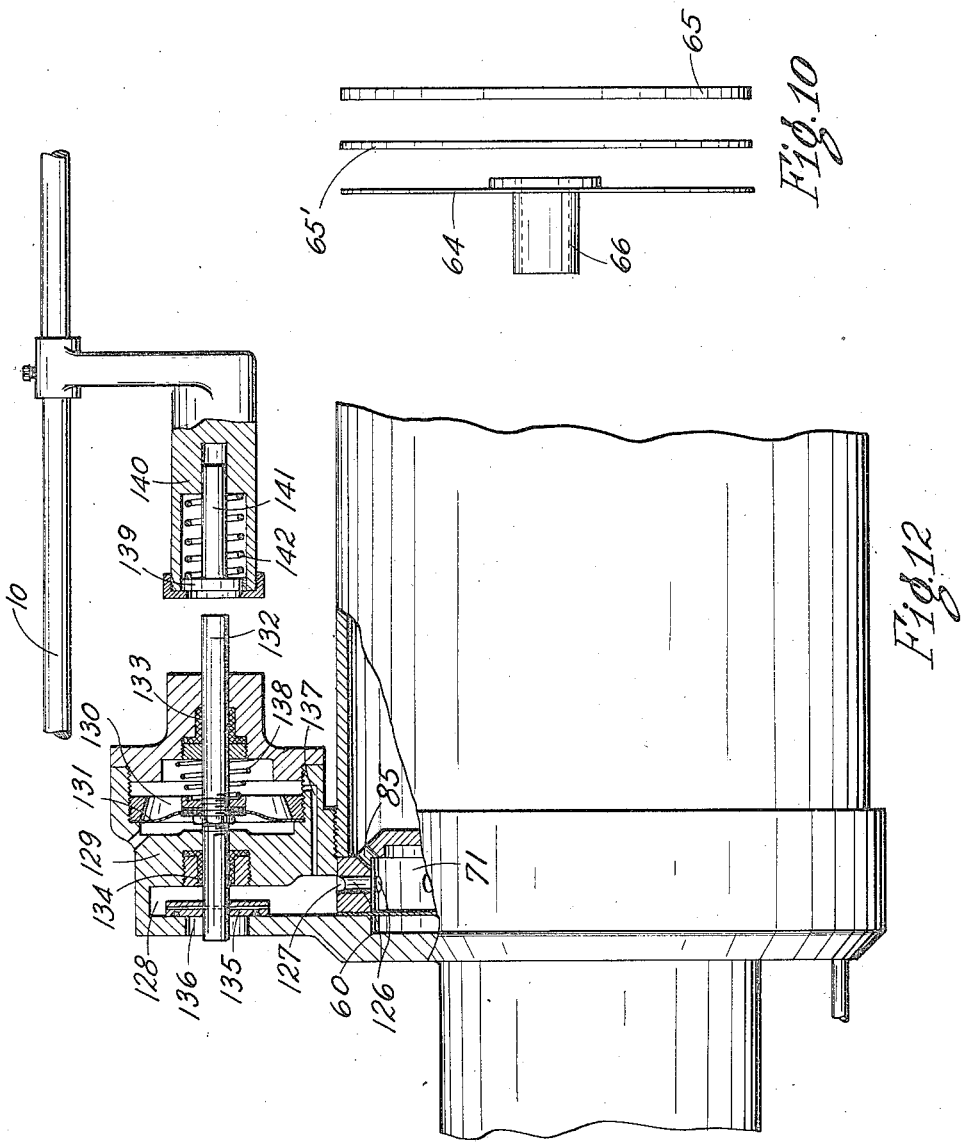

2,015,450

UNITED STATES PATENT OFFICE 2,015,450

AUTOMOTIVE VEHICLE CONTROL APPARATUS

Frederick G. Folberth and William M. Folberth, Cleveland, Ohio

Application May 17, 1932, Serial No. 611,854

12 Claims. (Cl. 121—38)

This invention relates to automotive vehicle control apparatus and more particularly to improved fluid pressure actuated means for operating the brakes of a motor vehicle.

In our U. S. Patent No. 1,968,484 and our copending United States patent applications, Serial No. 533,076, filed April 27, 1931; Serial No. 561,569, filed September 8, 1931, and Serial No. 585,818, filed January 11, 1932, we have described and claimed certain improvements in fluid pressure actuated brake operating mechanisms and means for controlling same. The present invention relates to improvements in the general type of apparatus shown and described in the above noted applications.

In the application of fluid pressure actuated mechanisms for operating the brakes of a motor vehicle it is important to provide means for smoothly and effectively applying the vehicle brakes under all conditions of operation of the vehicle, and it is among the objects of our invention to provide a fluid pressure actuated vehicle brake system which will smoothly and positively apply the vehicle brakes in accordance with the desires of the driver regardless of the conditions under which the vehicle may be operating. Other more specific objects are: the provision of an improved valve construction for controlling the flow of actuating fluid to and from the cylinder of a fluid pressure operated brake; the provision of an improved apparatus for effectively taking up the slack in the brake connections preparatory to applying the vehicle brakes; the provision of automatic means for operating the vehicle choke and throttle on application of the vehicle brakes whereby the choke will be automatically opened and the throttle automatically closed prior to opening the valve which controls the connection between the intake manifold of the vehicle engine and the brake operating cylinder.

The above and other objects of our invention will appear from the following description of several embodiments thereof, reference being had to the accompanying drawings, in which—

Figure 1 is a side elevation, partly in section, of the forward end of an automobile illustrating our improved brake actuating apparatus in its normal or brake released position.

Figure 2 is an enlarged side elevation of the brake operating cylinder together with the control valve and slack removing device.

Figure 3 is a fragmentary plan view of the apparatus shown in Figure 2.

Figure 4 is an enlarged sectional view taken on line 4—4 of Figure 3, and illustrating the auxiliary needle control valve in its closed position.

Figure 5 is a view similar to Figure 4 but illustrating the auxiliary needle control valve in its open position and the slack take-up diaphragm in the position it assumes after the main brake control valve has been opened.

Figure 6 is a modified form of auxiliary control valve adapted to perform substantially the same functions as that illustrated in Figures 4 and 5.

Figure 7 is an enlarged vertical cross section illustrating the main brake control valve and a portion of the brake operating cylinder.

Figure 8 is another sectional view of the valve shown in Figure 7 taken on line 8—8 of Figure 7.

Figure 9 is an enlarged view illustrating a modified form of valve plunger and closure member adapted to be used in the type of valve shown in Figures 7 and 8.

Figure 10 is a detached illustrative view showing our improved diaphragm construction which is preferably used in the main control valve shown in Figures 7 and 8.

Figure 11 is a diagrammatic layout illustrating our automatic choke and throttle control whereby the full manifold suction is always available to apply the vehicle brakes.

Figure 12 is a sectional view illustrating an improved atmospheric connection control device adapted for use with our fluid pressure brake system.

Referring to Figure 1 the automobile illustrated is equipped with the usual controls including a clutch operating lever 1 and a brake operating lever 2 adapted to be operated by foot pressure of the driver. A fluid pressure cylinder 3, containing a piston 4, is suitably mounted on the vehicle. The piston is operatively connected in any suitable manner, as by the cable 5, to the brake operating lever 2. A main control valve, generally indicated at V, is provided for controlling the connection between the cylinder 3 and the intake manifold 6 of the vehicle engine through the conduit 68. The atmospheric connection to the head end of the cylinder 3 is made through the conduit 7' which extends to an air cleaner or filter 7 suitably mounted on the dash or floor board of the vehicle. The piston rod end of the cylinder 3 is connected to the atmosphere through the conduit 7'' which joins the conduit 7' as seen in Figure 1. With this arrangement all atmospheric air entering the cylinder 3 and the valve mechanism must first pass through the filter 7 which is adapted to remove dust and other harmful material. The lever arm 8 is adapted to control the valve V and carries at its outer end the fluid pressure actuated valve lever retracting or slack taking-up control device S, which in turn is connected to an operating cam 9 by means of a rod 10. The cam 9 is adapted to be engaged by a roller 11 or the like on the clutch lever 1 and it will be understood that downward movement of the clutch lever 1 will cause the roller 11 to engage the cam 9, moving the rod 10 and valve control lever 8 in a direction to open the control valve V and apply the vehicle brakes.

An angular extension 12 of the rod 10 is adapted to slide on the piston rod 13 of the resistance imposing piston 14 and to engage the adjustable stop nuts 15. The auxiliary cylinder 16, in which the piston 14 is disposed, is connected by a conduit 17 to the cylinder 3. In operation, when the rod 10 is moved to open the valve V the angular extension 12 engages the stop nuts 15 and further movement of the rod 10 will be against the resistance offered by the piston 14, as fully explained in our co-pending application, Serial No. 585,818, filed January 11, 1932.

In our co-pending United States Patent application Serial No. 561,569, filed September 8, 1931, we have described and claimed an improved fluid pressure actuated brake hook-up incorporating means for retracting the brake control valve operating lever after it has been given its initial movement in opening direction. In Figures 2, 3, 4, 5, and 6, we have illustrated a means for improving the action of the valve lever retracting mechanism illustrated in said co-pending application.

The valve operating rod 10 is pivotally connected at its upper end to the angular extension or bracket 12. A diaphragm housing 18, containing a diaphragm 19, is pivotally secured to the upper end of the main control valve operating lever 8. Secured to the diaphragm 19 and extending out through the housing 18 is a rod 20 having a reduced end portion 21 adapted to seat in a suitable aperture in the bracket 12. An adjustable flange 22 has threaded engagement on the rod 20 and forms an abutment for one end of a coil spring 23, the other end of which seats against the diaphragm housing 18. The spring 23 normally exerts a force, adjustable by means of the adjustable flange 22, tending to maintain the diaphragm 19 in the position shown in Figure 4.

The diaphragm 19 divides the space within the housing 18 into two chambers, one of which, 24, is connected to the atmosphere through a hole 25 in the end wall of the housing 18. The other chamber 26, on the opposite side of the diaphragm 19 from chamber 24, is adapted to be connected to the intake manifold suction through the passage 27, the connecting passage 28, the conduit 29, the conduit 17, the cylinder 3, the main control valve V and the conduit 68. To control the connection of the chamber 26 to the intake manifold suction independently of the main control valve, an auxiliary needle type of valve 30, adapted to seat in the end of the passage 27, is provided. This needle valve 30 is secured to an auxiliary diaphragm 31 which is disposed in an auxiliary diaphragm chamber 32, preferably formed integrally with the housing 18. As will be clearly seen in Figure 4 the needle valve 30, when in its closed position, extends through the passage 28. However, as the needle valve is of relatively small diameter it does not close off the passage 28 but merely closes off the passage 27 which leads from the passage 28 to the chamber 26.

A stud 33 extends outwardly on the opposite side of the diaphragm 31 from the needle valve 30 and is adapted to guide one end of the coil spring 34, the other end of which is guided by the end 35 of the adjusting screw 36. The spring 35 is normally maintained under compression so that it tends to hold the diaphragm 31 and needle valve 30 in the position shown in Figure 4, that is, with the valve closed. The chamber 26 is thus closed off from the intake manifold suction. Upon the opening of the main control valve V the pressure within the cylinder 3 is reduced and this reduced pressure is applied through the conduits 17 and 29 to the passage 28. Extending from the passage 28 to the auxiliary diaphragm chamber 32 is a passage 37 and this passage 37 serves to apply the reduced pressure from the intake manifold to the diaphragm 31. When the pressure within the chamber 32 is reduced a sufficient amount the atmospheric pressure, which is applied to the opposite side of the diaphragm 31 through the passage 38, will force the diaphragm, against the spring 35, into the position shown in Figure 5. This movement of the diaphragm 31 will lift the needle valve 30 from its seat in the end of the passage 27 and will permit the reduced pressure to be applied to the diaphragm 19 in the chamber 26. As the chamber 24 is connected to the atmosphere this reduced pressure within the chamber 26 will permit the atmospheric pressure to force the diaphragm 19 to the left, against the spring 23, into the position shown in Figure 5. Inasmuch as the above noted action will not take place until the lever 8 has been moved to open the main valve, it will be seen that when the relative positions of diaphragm 19 and housing 18 change from the positions shown in Figure 4 into that shown in Figure 5 the main valve control lever 8 will be moved in valve closing direction. Thus, the initial opening of the valve V will serve to cause quick take up of the slack in the brake linkage and the valve V will then be closed to a point where the cylinder 3 and piston 4 will act merely to hold the brakes in position to be applied immediately upon further opening movement of the valve lever 8.

By adjusting the screw 36 the point at which the needle valve 30 will be lifted from its seat may be accurately controlled and thus the apparatus may be set so that a certain degree of vacuum will be created within the cylinder 3 before the needle valve 30 will be opened to apply vacuum to the chamber 26 and cause movement of the diaphragm 19 to move the lever 8 a limited amount in closing direction. This adjustable, fluid pressure actuated needle valve arrangement is particularly effective in providing means for accurately adjusting and controlling the slack take-up operation of the brake operating mechanism.

In order to permit free movement of the diaphragm 19 from the position shown in Figure 5 into the position shown in Figure 4 when the main control valve is closed, we have provided a check valve 39 which is normally held in closed position by a relatively light flat spring 40. This valve 39 is adapted to close the passages 41 which extend from the passage 37 into the chamber 26. The valve 39 will be closed when the main control valve V is open and the diaphragm 19 is moving to the left (Figures 4 and 5) but, when the main control valve V is in closed position, the cylinder 3, and hence the passage 28, will be connected to the atmosphere and movement of the diaphragm 19 to the right will cause the valve 39 to be lifted from its seat permitting air to freely enter the chamber 26 from the atmosphere. Thus, the retracting control device S will quickly assume its normal off position (Figure 4) when the main control valve is moved to its closed position and the system will be set for the next application of the vehicle brakes.

Figure 6 illustrates a modified form of device for controlling the slack take-up operations which consist essentially of a valve closure member 45 adapted to seat on the wall 46 of the diaphragm chamber 47. The closure member 45, when seated against the wall 46, is adapted to close the passages 47' which extend through a wall 46 into the chamber 48. To guide the closure member 45 and maintain it in proper position a guide member 49 may be secured thereto and have a sliding fit in a suitable aperture in the wall 46. The closure member 45 is normally maintained in seated position by means of the spring 50, the compression of which is adjustably controlled by means of the adjusting screw 51. A suitable lock nut 52 may be provided to maintain the adjusting screw 51 in the desired locked position. A passage 53 extends from the chamber 48 through the housing 54 and connects with a passage 55 which may be connected to the left hand end of the cylinder 3 by a suitable conduit arranged in the same manner as conduit 29 in the apparatus illustrated in Figures 3, 4, and 5.

A check valve 56, normally maintained seated against the wall 46 by the flat spring 57, is adapted to control the passages 58 which extend from the chamber 47 into the passage 53. This check valve 56, as will be readily understood, permits the passage of air into the chamber 47 when the diaphragm 59 moves to the right (Figure 6) but remains seated when the diaphragm 59 is moved to the left upon application of vacuum through the passage 55.

It will be understood that the apparatus shown in Figure 6 is adapted to take the place of the needle type control valve illustrated in Figures 4 and 5. The diaphragm 59 corresponds to diaphragm 19 of Figures 4 and 5 and performs exactly the same functions and is mounted in the same manner on the apparatus. Assuming that the device of Figure 6 is mounted on the main valve control lever 8 and the lever 8 has been moved to connect the source of reduced pressure to the cylinder 3, this reduced pressure will be applied to the left hand side (Figure 6) of the closure member 45 through the connecting passages which have been described. However, the spring 50 will maintain the closure member 45 seated against the wall 46 until the vacuum within the chamber 48 reaches a value where the atmospheric pressure on the right hand side (Figure 6) of the closure member 45 overcomes the force of the spring 50 and lifts the valve from its seat. When this occurs air will be withdrawn from the chamber 47 and the diaphragm 59 will be moved to the left to effect the slack take-up control function of the apparatus. By adjusting the screw 51 the pressure at which the valve 45 will open may be accurately regulated and thus the slack take-up control mechanism may be set to operate when the vacuum in the cylinder 3 reaches the desired point. Although we have described a particular type of slack take-up control apparatus it will be understood that our control valve which renders the slack take-up control device inoperative until a certain pressure is obtained within the cylinder may be applied to any form of fluid pressure operated slack take-up control mechanism.

In our co-pending United States Patent application, Serial No. 533,076, filed April 27, 1931, we have described and claimed an improved main vacuum control valve for fluid pressure actuated devices and in Figures 7, 8, 9, and 10 of the present application, we have illustrated a valve of the same general type disclosed in said co-pending patent application but embodying certain improvements therein.

Referring now to Figure 7, the valve structure is mounted on the end of the cylinder 3 and includes a main diaphragm chamber which may be generally indicated by C and which is formed by the end cap 60 and the auxiliary end cap 61. The end cap 60 is secured to the cylinder 3, as by threaded engagement at 62, and the auxiliary end cap 61 seats against the end of the cylinder 3 and is maintained in position by the inwardly extending shoulder 63 on the end cap 60. The relatively flexible diaphragm 64, and the relatively stiff diaphragm or disc 65 are clamped at their outer peripheries between the flange 63 and the adjacent portion of the auxiliary end cap 61. Secured to the inner periphery of the flexible diaphragm 61 is a flanged tubular member 66 which passes through a suitable aperture in the end cap 60 into the chamber 67. The conduit 68 leads from the chamber 67 to the intake manifold of the vehicle engine or other source of actuating fluid pressure. A suitable packing 69 is adapted to form a fluid tight joint around the tubular member 66. The closure member 70 is disposed within the right hand side 71 of the diaphragm chamber C and has a tubular extension 72 which extends out through the tubular member 66 and is adapted to be acted on by the cam 73 which is mounted on the same shaft 74 with the main valve operating lever 8. It will be noted that the outer end of the tubular extension 72 is open to the atmosphere. A spring 75 is adapted to normally maintain the closure member 70 seated against the flanged seat 76 of the tubular member 66.

In operating the valve mechanism rotation of the shaft 74 in the proper direction will cause the cam 73 to push the closure member 70 to the right (Figure 7) and effect opening of the valve as will be later explained. A plunger member 77 extends through suitable packing 78 in the auxiliary end cap 61. This plunger member 77 carries an enlarged disc seat 79 on the end which projects into the chamber 71 and, at its other end, is secured to the auxiliary diaphragm 80. This auxiliary diaphragm 80 is held in a recessed portion 81 of the auxiliary end cap 61 by means of a threaded ring 82. It will be seen from the drawings that the auxiliary diaphragm 80 is exposed on its right hand side to the interior of the cylinder 3 and forms a sealed chamber between its left hand side and the auxiliary end cap 61. A cross shaped flat spring 83, best seen in Figure 8, engages the disc seat 79 and tends to maintain said disc seat in contact with the right hand seating surface of the closure member 70. This spring 83 is preferably made of spring steel and is seated at the outer ends of its cross arms, against a shoulder 84 on the auxiliary end cap 61. It will be noted that in Figures 7 and 12 the conduit 17 which is adapted to connect the main cylinder to the auxiliary cylinder is connected into the main cylinder through suitable passages in the end caps 60 and 61, the chamber 71 and passages 85 rather than directly through the main cylinder wall, as is shown in Figures 1 and 2. The same results are secured with either form of construction.

In Figure 10 we have illustrated the flexible diaphragm 64 with the tubular member 66 secured thereto and have shown the relatively stiff disc 65 and a separating ring 65' which may be employed to separate the outer peripheries of the diaphragm 66 and the disc 65. For the purpose of illustration these parts are shown in Figure 10 in spaced apart relation.

In the operation of the above described valve, when the valve is closed the closure member 70 seats on one side against the movable seat 76 and on its opposite side against the movable disc seat 79. If it is desired to open the valve to connect the interior of the cylinder 3 to the source of vacuum the operating lever 8 is turned to actuate the cam 73 to move the closure member 70 to the right. When this movement takes place the left hand seating surface of the closure member 70 is moved away from the seat 76 and the vacuum connection is completed to the interior of the cylinder 3 through the pipe 68, the chamber 67, the tubular member 66, the chamber 71 and the holes 85 which connect the chamber 71 with the interior of the cylinder 3. When the closure member 71 is moved to the right, as above noted, it also forces the plunger member 77 and the diaphragm 80 to the right and the parts may be assumed to be in the position shown in Figure 7. As the pressure is reduced within the chamber 71 and the cylinder 3 the relatively flexible diaphragm 64 will be moved to the right by the atmospheric pressure which enters the chamber 86 through the hole 87 in the end cap 60. The initial movement of the diaphragm 64, together with the tubular member 66, will occur upon the creation of a relatively small vacuum within the chamber 71. However, as soon as the flexible diaphragm 64 moves to the right and strikes the relatively rigid disc 65 a considerably greater degree of vacuum will be required within the chamber 71 to cause a corresponding movement of the tubular member 66 and its seat portion 76.

This double diaphragm construction, however, does not interfere with the quick return of the tubular member 66 to its normal position upon the admission of atmospheric pressure to the chamber 71 and gives a desirable resistance to movement of the seat 76 in one direction while permitting free movement of this seat in the opposite direction. It will be understood that as soon as the seat 76 has been moved into contact with the closure member 70 both the vacuum and atmospheric connections to the cylinder 3 will be closed and the degree of vacuum which has been produced within the cylinder 3 will be maintained. Upon further movement of the closure member 70 to the right the substantially same actions will take place and the degree of vacuum within the cylinder 3 will be increased. This, of course, will increase the braking effort applied to the vehicle brakes.

To release the brakes it is necessary to move the closure member 70 to the left away from the disc seat 79. The spring 75 will cause this movement when the cam 73 is moved to relieve the pressure on the tube 72. As soon as the seat 70 moves away from the disc 79 air under atmospheric pressure will rush in through the tube 72 between the closure member 70 and the disc 79 into the chamber 71 and the interior of the cylinder 3. By providing the auxiliary diaphragm 80 the movement of the disc 79 to the left, which movement is caused by the cross shaped spring 83, is retarded so that the closure member 70 may be moved away to complete the atmospheric connection. This action will be understood if we assume that the vehicle brakes have been applied and a certain degree of vacuum exists within the cylinder 3. This vacuum will be applied to the right hand side of the diaphragm 80 and will be considerably higher than the very slight partial vacuum which may exist on the opposite side of the diaphragm 80 due to its movement away from the auxiliary end cap 61. Therefore a force will be exerted on the plunger 77 tending to pull it to the right (Figure 7) and this force will continue until after the closure member 77 has been moved to the left to permit the atmospheric connection to the cylinder. This lag in the action of the plunger 77 is due to the fact that it takes a certain period of time for the air under atmospheric pressure to enter the cylinder 3 through the chamber 71 and the holes 85 and during this period there is a pressure differential between the two sides of the diaphragm 80 which is strong enough to overcome the spring 83 and keep the disc 79 from moving to the left.

As soon as the pressure within the cylinder 3 approaches that of the atmosphere the pressure differential on opposite sides of the diaphragm 80 will be reduced to such a degree that the spring 83 will move the disc 79 back into seated position against the right hand face of the closure member 70. When this occurs the apparatus will be in a static condition and the pressure within the cylinder 3 will be maintained at its then value.

The valve construction just described is generally similar to that described in our co-pending United States patent application, Serial No. 533,076, but may be distinguished therefrom in its main double diaphragm arrangement and in its modified auxiliary diaphragm arrangement in which the auxiliary diaphragm is open to the interior of the cylinder 3 through an unrestricted connection on one side and forms a completely sealed chamber on the opposite side.

In Figure 9 we have illustrated an atmospheric bleeder valve arrangement which is adapted to be incorporated in the plunger 77 of the valve shown in Figure 7. The tubular portion 72 of the closure member 70 is connected to the atmosphere and the closure member 70 seats against the disc 79 during its movement in opening direction (to the right in Figures 7 and 9). The plunger 77 is provided with a central passage 90 in which is loosely disposed a rod or plunger 91. The passage 90 is formed with a flange 92 at its inner end and this flange forms a seat for the end of the plunger 91. A coil spring 93 abuts against one end of the plunger 91 and is maintained in position by a screw plug 94. This spring 93 tends to maintain the plunger 91 seated against the flange 92 thus closing off the hole 95 which extends through the flange 92. One side of the plunger 91, at a point adjacent its inner end, is cut away as at 96 and a bleeder passage 97 extends from the hole 90 into the chamber 71.

The operation and function of the above described bleeder control valve is as follows:

During the opening movement of the closure member 70 it is sometimes desirable to permit a bleeding of atmospheric air into the chamber 71 and the cylinder 3 to somewhat equalize and smooth out the effect of the intake manifold suction. This bleeding action takes place whenever a vacuum of sufficient value is created within the chamber 71 to overcome the strength of the spring 93. It will be understood that, as the rod 91 fits loosely in the passage 90, the pressure in the entire space within the passage 90 will be reduced to the value existing within the chamber 71 because of the connection 97. Thus atmospheric pressure acting through the hole 95 upon the plunger 91 will move the plunger 91 against the spring 93. When this occurs air under atmospheric pressure will pass from the tube 72 through the hole 95, past the end of the plunger 91 (which will be moved away from its seat on the flange 92), the cut-away portion 96 and the passage 97 into the interior of the chamber 71. The spring 93 may be made of such strength that this leakage or bleeding of atmospheric air into the cylinder will not take place until a certain desired vacuum has been obtained within the cylinder. In order to make it possible to secure the maximum available braking effect when desired, an annular seat 98 is mounted on the wall 61 of the auxiliary end cap and it will be noted that, when the closure member 70 has been moved to the right its maximum distance and the shoulder 99 on the disc 79 is seated against the seat 98, the passage 97 will be completely closed off and the atmospheric bleeder connections will be rendered ineffective. Thus, the maximum possible vacuum will be created within the cylinder 3 and there will be no dilution or reduction of this vacuum due to bleeding to the atmosphere through the bleeder connections just described. This device permits an atmospheric bleeding connection during a pre-determined portion of the operation of the brake operating mechanism and further permits a complete closing off of the bleeder connection when it is desired to secure the maximum braking effect.

The operation of applicants' apparatus which has been described above will now be explained. Assuming that the vehicle brakes are released and the clutch is engaged, if the operator wishes to apply the vehicle brakes by means of our improved fluid pressure actuated mechanism he pushes down with his foot on the clutch operating lever 1. The first downward movement of this lever causes disengagement of the clutch. After the clutch has been disengaged the roller 11 will strike the cam member 9 and move the rod 10 to the left (Figures 1 and 2) against the retracting force of the spring 9. This movement of the rod 10 will be transmitted through the bracket 12, the end 21 of the rod 20, the flange 22 and the spring 23 to the housing 18 which is secured to the upper end of the lever 8. As the spring 23 is stronger than the springs which resist movement of the lever 8 in valve opening direction (to the left in Figure 2) the lever 8 will be moved to the left thus causing opening of the main control valve V upon the initial movement of the rod 10 to the left. This opening of the valve V will connect the cylinder 3 to the sub-atmospheric pressure of the intake manifold and a force will be exerted on the piston 4 tending to move said piston to the left. Such movement of the piston 4 to the left exerts a pull on the cable 5 which is transmitted to the brake lever and the entire brake mechanism is moved in brake applying direction. As soon as predetermined pressure conditions obtain within the cylinder 3 the control valve 30 will be lifted from its seat by the diaphragm 31, as has been fully described above; and the pressure within the left hand end of the cylinder 3 will be applied to the chamber 26 of the housing 18 of the brake take up control device S. The reduced pressure thus applied to the chamber 26 will permit the housing 18 to be moved to the right by means of the spring 75 (Figure 7) which acts on the cam member 73 to exert a valve closing force on the lever 8. During this closing movement of the lever 8 the housing 18 will move to the right and the diaphragm 19 will remain relatively stationary and the spring 23 will be compressed into the position shown in Figure 5. The rod 10 and the bracket 12 will not be moved to the left (Figures 1 and 2) during this relative movement of the diaphragm 19 and housing 18 because the end 21 of the rod 20 is not secured to the bracket 12 but merely has a sliding fit therein and is provided with an enlarged flange adapted to abut the bracket 12 so that valve opening movement can be transmitted therethrough.

As has been described above the spring 34 (Figure 5 will be so loaded by the screw 36 that the take up control device S will be actuated when the desired and predetermined pressure conditions have been reached within the cylinder 3. The apparatus is preferably so set that the initial downward movement of the operator's foot on the lever 1, after the roller 11 strikes the cam 9, will cause the end of the bracket member 12 to strike the lock nuts 15 on the end of the rod 13. This movement will open the valve V and rapidly evacuate the left hand end of the cylinder 3 to a degree sufficient to move the brake mechanism into position where further movement will cause immediate application of the brakes. As soon as these pressure conditions obtain within the cylinder 3 the slack take up control device S becomes effective to retract the lever 8 and close the valve V preferably to a point just sufficient to maintain the brake linkage in position for immediate engagement of the brake shoes within the brake drums. Now, when the operator wishes to apply the vehicle brakes he depresses the lever 1 to a greater degree. This moves the valve lever 8 to the left causing further opening of the valve V and the brakes are applied to the desired degree as has been explained above. During this additional movement the valve operating force is transmitted through the rod 10, the end of the bracket 12, the rod 20 and the casing 18 to the lever 8.

In releasing the brake the operator merely relieves the pressure on the lever 1 thus relieving the pressure on the rod 10 and permitting the valve lever 8 to be moved to the right by the spring 75. When the vacuum within the cylinder 3 has been reduced sufficiently to permit the spring 34 to move the diaphragm 31 and the valve member 30 into position to close off the vacuum connection to the chamber 26 and the pressure within the left hand end of the cylinder 3 returns to atmospheric pressure, the valve 39 will open and permit atmospheric pressure to obtain within the chamber 26. When this occurs the spring 23 will move the diaphragm 19 to the right into its original position as shown in Figure 4 and the entire apparatus will then be ready for another cycle of brake applying operations.

In Figure 12 we have illustrated an auxiliary valve arrangement which is particularly adapted to control the atmospheric connection to the cylinder 3. This valve is designed to permit an instantaneous substantially unimpeded flow of air into the cylinder 3 when it is desired to release the vehicle brakes. As shown in Figure 12 our atmospheric connection control is secured to the end cap 60 of the cylinder 3 and is connected to the chamber 71 through the holes 126 and the annular chamber 127 which opens into the chamber 128 in the housing 129 of the atmospheric control device. A diaphragm chamber 130 is formed in the housing 129 and a diaphragm 131 is suitably mounted therein. Secured to the diaphragm 131 and extending outwardly on both sides thereof is a rod 132. Suitable packing rings 133 and 134 are adapted to provide a substantially fluid tight seal around the rod 132 at the points where it passes out of the diaphragm chamber 130. The left hand end of the rod 132 (Figure 12) carries a closure member 135 which, when seated, is adapted to close the opening 136 which connects the chamber 128 to the atmosphere. A passage 137 connects the diaphragm chamber 130, on the right hand side of the diaphragm 131, to the pressure conditions which exist within the chamber 71. A spring 138 is seated within the chamber 130 and is adapted to normally hold the closure member 135 seated to close the opening 136. This spring is preferably made just strong enough to overcome the effect of a relatively light vacuum, say for example five pounds. Thus, upon operating the vehicle brake control mechanism the opening 136 would be maintained closed by the closure member 135 until the vacuum within the chamber 71, chamber 130 and the cylinder 3 is more than five pounds. However, before the main control valve is opened enough to permit such a vacuum to be created in the chamber 71 and chamber 130, the end 139 of the member 140 will strike the right hand end of the rod 132. This member 140 is adjustably mounted on the main valve operating rod 10. The end portion 139 is mounted on or formed integrally with an inwardly extending shank 141 which is disposed in the recessed end portion of the member 140. A spring 142 is adapted to be compressed when the end member 139 is pushed against the right hand end of the rod 132 and this spring 142 is made of sufficient strength so that when its force is added to that of the spring 138 the suction which is applied to the diaphragm 131 through the passage 137 will never be great enough to lift the closure member 135 from its seat and open the atmospheric connection 136.

Thus, in operating the brake mechanism the closure member 135 will be positively held against its seat to close the atmospheric opening 136 during the brake applying movement of the main control valve operating connections. However, when the rod 10 is moved in a direction to close the main control valve the end member 139 will be moved in a direction away from the rod 132 and the reduced pressure within the chamber 130 will now be sufficient to overcome the spring 138 and whatever force is exerted by spring 142 and move the closure member 135 away from its seat. This will open the relatively large atmospheric connection to the cylinder 3 through the opening 136, the chamber 128, the holes 126, the chamber 71 and the holes 85. Of course as soon as the vacuum in chamber 130 is reduced sufficiently the combined force of springs 138 and 142 will again move member 135 into seated position and shut off the atmospheric connection.

The effect and purpose of the atmospheric control device which is above described is to assist in the rapid restoration of the interior of the cylinder 3 to atmospheric pressure when the operator's foot is completely removed from the pedal which operates the brake control valve and to provide a means for permitting atmospheric pressure to enter the cylinder in relatively small increments corresponding to relatively small movements of the control valve in brake releasing direction. It will be understood that the main control valve mechanism illustrated in Figures 7, 8, and 9 provides for an effective releasing action of the vehicle brakes when desired and that the above described atmospheric control device may be considered an accessory which may or may not be used depending on the operating conditions and installation problems which may be encountered.

In operating motor vehicles having brakes which are connected to be operated by the intake manifold suction conditions sometimes arise when the intake manifold suction is at a relatively low point. If these conditions exist and it is desired to apply the brakes it will be seen that the maximum force available for applying the vehicle brakes will not be as great as that which obtains when the intake manifold suction is at its maximum value. Broadly it may be said that the suction in the intake manifold of an internal combustion engine is greatest when the throttle valve is closed and the engine is operating at low or idle speed. In order to assure a sufficiently high vacuum in the intake manifold at all times when it is desired to apply the vehicle brakes by means of our improved apparatus we have provided an interconnecting mechanism by virtue of which, whenever the pedal is moved to actuate the control valve to apply the vehicle brakes, the throttle valve, if it is open, will be closed and the choke valve, if it is closed, will be opened to a certain degree. This closing of the throttle valve and opening of the choke valve preferably takes place just prior to opening the main control valve to connect the brake cylinder to the intake manifold and assures a sufficiently high vacuum to effectively apply the vehicle brakes.

In Figure 11 we have shown diagrammatically an arrangement which is adapted to positively close the throttle valve and open the choke valve just prior to the opening of the brake control valve. In this figure, which is merely illustrative, the vehicle engine is represented by the phantom lines 100. The brake operating cylinder 101 carries the control valve lever 102 which is adapted to be actuated by movement of the vehicle clutch pedal 103 through the cam 104 and the rod 105. This arrangement is substantially the same as that illustrated in Figure 1 of the drawings. The piston within the cylinder 101 may be connected to operate the vehicle brake through the cable 106.

A cross shaft 107 is supported in suitable bearing brackets 108 which may be mounted on the transmission housing or other suitable location. Secured to one end of the cross shaft 107 is a lever 109. A rod 110 is pivotally secured at one end to the clutch lever 103 and has a sliding engagement at its opposite end in a suitable aperture in the lever 109. An adjustable stop member 111 is secured to the rod 110 for purposes to be later described. The opposite end of the cross shaft 107 from the lever 109 carries oppositely extending arms or levers 112 and 113. The outer end of the lever 112 is slotted and a rod 114 extends through the slot in the lever 112 and is connected to the throttle operating lever 115. The throttle valve 116 may be of the usual construction and is adapted to be operated by movement of the lever 115. The choke valve 117 is disposed in its usual location in the air intake to the carburetor 118 and is adapted to be operated by a lever 119. Pivotally secured to the lever 119 is a rod 120 which extends through and has sliding engagement in a slot in the outer end of the lever 113. An adjustable stop 121 is secured to the rod 114 behind the lever 112 and an adjustable stop 122 is secured to the lever 120 in front of the lever 113.

A spring 123 may be secured at one end to the arm 124, which extends downwardly and is fastened to the cross shaft 107, and at its other end to the transmission housing in any suitable manner. This spring 123 is maintained in tension so that it tends to rotate the cross shaft 107 so that the lever 109 will move in counter clockwise direction as seen in Figure 11.

To explain the operation of the above described mechanism it will be well to assume that the vehicle driver has opened the throttle valve 116 to the position shown in full lines by means of the hand throttle control and that he has closed the choke valve 117 to substantially the position shown in full lines. These are adjustments which are commonly made by the operator in starting the engine in cold weather and under these conditions the intake manifold suction will not be at its maximum value due to the open position of the throttle 116. If the operator desires to apply the vehicle brakes he pushes down on the clutch operating lever 103. Just prior to movement of the control valve lever 102 through the cam member 104, the stop 111 engages the lever 109 and further downward movement of the clutch lever 103 causes the lever 109 and the cross shaft 107 to be rotated in clockwise direction. This movement of the cross shaft 107 swings the lever 112 to the right (Figure 11) causing it to engage the stop 121 and move the rod 114 in the direction indicated by the arrow, thus closing the throttle valve. At the same time the lever 113 will be moved to the left (Figure 11) and will strike the stop member 122 moving the rod 120 in the direction indicated by the arrow and opening the choke valve 117. By adjusting the positions of the stop members 111, 121 and 122 and properly proportioning the lengths of the lever arms 109, 112 and 113, the desired operation may be readily secured and by providing the sliding connections between the lever 109 and the rod 110, the lever 112 and the rod 114, and the lever 113 and the rod 120, the normal operation of the vehicle clutch, throttle and choke, by means of the usual controls, will not be interfered with. However, whenever the vehicle throttle is open and the choke is closed to a predetermined point, our interconnecting mechanism will act to close the throttle valve and open the choke valve just prior to opening the main control valve to actuate the vehicle brakes. The usual throttle and choke operating connections are not shown in Figure 11 but it will be understood that they may be of the usual type. It will also be understood that if the throttle valve is closed our apparatus will act to open the choke valve and if the choke and throttle valve both happen to be open our device will operate to close the throttle valve without interfering with the choke mechanism. In other words, the device is effective on the throttle valve only when it is in open position and on the choke only when it is in closed position. By properly adjusting the stops 121 and 122 the apparatus shown in Figure 11 may be rendered ineffective as to either the throttle valve or the choke valve and may thus be readily adjusted to take care of all conditions.

Although we have illustrated and described in considerable detail certain embodiments of our invention, it will be understood by those skilled in the art that modifications and variations may be made in the apparatus herein shown and described without departing from the spirit of our invention. We do not, therefore, limit ourselves to the specific forms of our invention herein illustrated and described, but claim all embodiments thereof coming within the scope of the appended claims.

We claim:

1. In a valve for controlling the connections between a brake actuating cylinder and a source of fluid pressure, a closure member, a movable seat adapted to engage said closure member, said seat being secured to a relatively flexible diaphragm, means for supporting said relatively flexible diaphragm at the outer periphery thereof and a relatively inflexible disc member supported at its outer periphery adjacent to and on one side of said relatively flexible diaphragm.

2. In a control valve of the class described, a closure member, a movable seat adapted to move toward and away from said closure member and means for supporting said movable seat whereby an additional resistance to movement of said seat will be imparted during a portion only of its movement toward said closure member.

3. In a control valve of the class described, a relatively flexible diaphragm, a closure member supported by said diaphragm, and a relatively inflexible disc member supported on one side of said diaphragm and adapted to be engaged by said diaphragm during movement in one direction whereby the force required to move said diaphragm and closure member will be increased.

4. In a valve of the class described a movable closure member, a seat carried by a relatively flexible diaphragm and adapted to engage said closure member, a relatively inflexible disc member supported adjacent said diaphragm, said disc member being normally spaced from said diaphragm and adapted to be engaged by said diaphragm during the operating movement thereof, whereby an additional resistance will be imposed against movement of said diaphragm and closure member in one direction only.

5. In a valve of the class described, a movable closure member and a movable seat adapted to co-act therewith, a diaphragm adapted to support said seat and permit movement thereof, said diaphragm being open to the atmosphere on one side, and means for increasing the resistance to movement of said diaphragm and seat during a portion only of their movement in one direction only.

6. In a valve for controlling the fluid connections to a cylinder of the class described, a diaphragm mounted within said cylinder and exposed on one side to the interior of said cylinder, a plunger member secured to said diaphragm and carrying a disc seat member, a movable closure member adapted to seat on said disc seat member and a flat spring member, said spring member being adapted to engage said disc seat and tending to move said disc seat toward said closure member.

7. In a valve having an atmospheric connection therethrough and adapted to control the operation of fluid pressure actuated vehicle brake actuating mechanism and the like, a closure member, a movable seat adapted to engage said closure member to close the atmospheric connection through the valve and an atmospheric bleeder bypass conduit adapted to permit an atmospheric connection when said closure member is seated upon said seat.

8. In a valve for controlling the atmospheric and other than atmospheric fluid pressure connections to a cylinder of the class described, a closure member and a co-acting movable seat therefor, said seat and closure member being adapted when in engaged position to close the atmospheric connection to said cylinder and a bleeder conduit adapted to permit a relatively restricted atmospheric connection to said cylinder when said seat and closure member are in engaged position.

9. In a valve for controlling the atmospheric and other than atmospheric fluid pressure connections to a cylinder of the class described, a closure member and a co-acting movable seat therefor, said seat and closure member being adapted when in engaged position to close the atmospheric connection to said cylinder, a bleeder conduit adapted to permit a relatively restricted atmospheric connection to said cylinder when said seat and closure member are in engaged position, and means, responsive to fluid pressure, for controlling the flow of air through said bleeder conduit.

10. In a valve for controlling the atmospheric and other than atmospheric fluid pressure connections to a cylinder of the class described, a closure member and a co-acting movable seat therefor, said seat and closure member being adapted when in engaged position to close the atmospheric connection to said cylinder, a bleeder conduit adapted to permit a relatively restricted atmospheric connection to said cylinder when said seat and closure member are in engaged position, means, responsive to fluid pressure, for controlling the flow of air through said bleeder conduit, during movement of said seat, and means for positively closing said bleeder conduit when said seat reaches a predetermined point in its movement.

11. In a valve for controlling the atmospheric and other than atmospheric fluid pressure connections to a cylinder of the class described, a closure member and a co-acting seat therefor, said seat and closure member being adapted when in engaged position to close the main atmospheric connection to said cylinder, a bleeder conduit adapted to permit a relatively restricted atmospheric connection to said cylinder when said seat and closure member are engaged, and means, effective when the valve is in substantially its extreme open position to connect the cylinder to the source of other than atmospheric fluid pressure, for closing said bleeder conduit.

12. In apparatus of the type described, a housing having a diaphragm chamber therein, a diaphragm in said chamber, an operating rod secured to said diaphragm and extending out through said housing, spring means for normally maintaining said diaphragm in one extreme position, a fluid pressure conducting conduit extending into said diaphragm chamber on one side of said diaphragm, a valve for normally maintaining said conduit closed, means, responsive to fluid pressure within said conduit, for opening said valve, and a check valve adapted to connect said diaphragm chamber to said conduit when said first named valve is closed and said diaphragm is being moved toward its first named extreme position by said spring.

FREDERICK G. FOLBERTH.
WILLIAM M. FOLBERTH.